United States Patent [19]

Gerresheim et al.

[11] Patent Number: 4,815,512
[45] Date of Patent: Mar. 28, 1989

[54] TREAD SURFACE PROFILE FOR PNEUMATIC VEHICLE TIRES

[75] Inventors: Manfred Gerresheim, Wurselen; Jürgen Sommer; Dionysius J. Poque, both of Aachen; Hans-Jügen Vögler, Herzogenrath, all of Fed. Rep. of Germany

[73] Assignee: Uniroyal Englebert Reifen GmbH, Aachen, Fed. Rep. of Germany

[21] Appl. No.: 82,021

[22] Filed: Aug. 5, 1987

[30] Foreign Application Priority Data

Aug. 5, 1986 [DE] Fed. Rep. of Germany ....... 8620979
Oct. 29, 1986 [DE] Fed. Rep. of Germany ....... 8618826

[51] Int. Cl.$^4$ .................... B60C 11/06; B60C 11/11
[52] U.S. Cl. .......................... 152/209 R; 152/209 D
[58] Field of Search .................. 152/209 R, 209 D; D12/142

[56] References Cited

U.S. PATENT DOCUMENTS

| 4,278,121 | 7/1981 | McDonald | 152/209 R |
| 4,289,182 | 9/1981 | Sato et al. | 152/209 R |
| 4,424,845 | 1/1984 | Baus et al. | 152/209 R |
| 4,462,445 | 7/1984 | Goergen | 152/209 R |
| 4,690,189 | 9/1987 | Bradisse et al. | 152/209 R |

FOREIGN PATENT DOCUMENTS

| 0018462 | 11/1980 | European Pat. Off. | 152/209 D |
| 55-114605 | 9/1980 | Japan | 152/209 D |
| 0385240 | 12/1932 | United Kingdom | 152/209 R |

Primary Examiner—Michael W. Ball
Assistant Examiner—Ramon R. Hoch
Attorney, Agent, or Firm—Becker & Becker, Inc.

[57] ABSTRACT

A tread surface profile including a three-part configuration. A circumferentially extending, centrally disposed, linear or zigzagged rib has connected on both sides thereof a plurality of central blocks that are separated from the rib by shallow and narrow venting grooves. On both sides of the rib, pluralities of profiled blocks that extend from a tire shoulder toward the rib, with the profiled blocks being separated from the central blocks of the latter by longitudinal, circumferentially extending channels, and being separated from one another by lateral channels. The profiled blocks and the central blocks are arranged in S-shaped configurations that extend over the width of the tread surface in a diagonal fashion. The shoulder end of each profiled block is oriented axially at an angle of from 90° to 80° relative to the central tire plane, and each rib end of the central blocks is oriented circumferentially at an angle of from 35° to 55° relative to the central tire plane. The lateral channels are connected to one of the longitudinal channels, with at least a portion of the latter being circumferentially oriented at an angle of from 0° to 65°. The profile portion formed by the rib and central blocks extends over 25 to 40% of the of tread surface width. The profiled and central blocks are provided with sipes that extend parallel to the lateral channels and are connected to at least one of the longitudinal channels and venting grooves.

28 Claims, 6 Drawing Sheets

TREAD SURFACE PROFILE FOR PNEUMATIC VEHICLE TIRES

BACKGROUND OF THE INVENTION

The present invention relates to a tread surface profile for a pneumatic vehicle tire that has a radial carcass construction with a belt-like reinforcement. The tread surface profile comprises a circumferentially extending, centrally disposed zigzagged linear rib, and a plurality of profiled blocks that are separated in the circumferential direction by lateral channels. The profiled blocks are shaped and arranged in such a way that pairs of them, i.e. a profiled block from each side of the rib, form an S-shaped configuration that is disposed diagonally over the width of the tread surface. Disposed on both sides of the rib are longitudinal channels that extend in the circumferential direction, and to which the aforementioned lateral channels are connected.

Tread surface profiles of this general type have good traction and stability when moving straight ahead; such profiles are also able to remove water well, and run quietly. However, the arrangement and design of the ribs and blocks represents a compromise solution with respect to all of the profile properties. Thus, depending upon requirements, one and/or another of the properties is preferred, and the profile is accordingly shaped in a specific yet selectable manner.

Since, for example, in the automobile industry vehicles are increasingly being developed with distinctly reduced drag coefficients, the so-called $C_w$ value, and additionally with more quietly running motors, the vehicle noise is determined more and more by the operating noise of the tires. Furthermore, in a number of states the lawmakers are revising the laws so that in the future noisy vehicles will no longer be permitted on the streets.

Starting with the understanding that therefore a vehicle tire will not be permitted to generate much operating noise, it is an object of the present invention to provide a tread surface profile that produces less noise. At the same time, the safety features with regard to operating under wet conditions should be optimized.

BRIEF DESCRIPTION OF THE DRAWINGS

These and other objects of the present invention will appear more clearly from the following specification in conjunction with the accompanying schematic drawings, in which.

SUMMARY OF THE INVENTION

Figure 1:
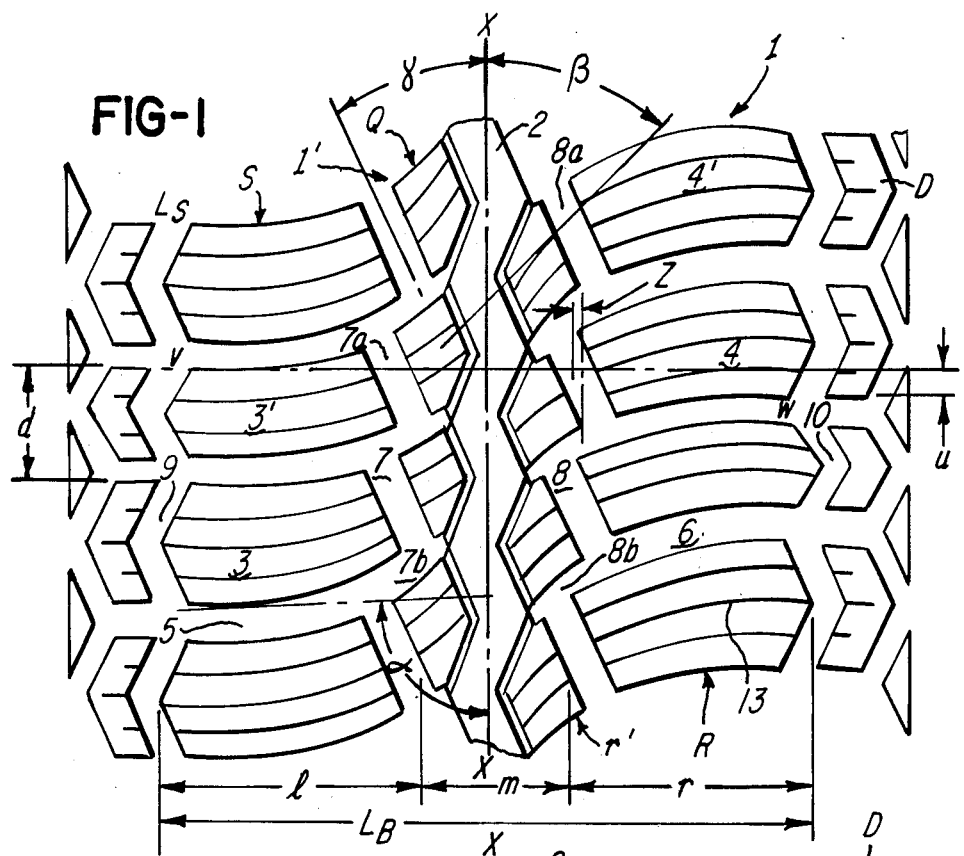
FIG. 1 is a partial plan view of one exemplary embodiment of the inventive tread surface profile.

The tread surface profile of the present invention is characterized primarily by an essentially three-part configuration that includes: a circumferentially extending, centrally disposed, linear or zigzagged rib that is disposed in the central plane of the tire, said rib having connected on both sides thereof a plurality of central blocks that are separated from the rib by shallow and narrow venting grooves; and, on both sides of the rib, pluralities of profiled blocks that respectively extend from a tire shoulder toward the rib, with the profiled blocks on a given side of the rib being separated from the central blocks of the latter by a longitudinal, circumferentially extending channel, and being separated from one another, when viewed in the circumferential direction of the tire, by respective lateral channels that are deeper and wider than the venting grooves; the profiled blocks and the central blocks are disposed in such a way that respective S-shaped configurations are formed comprised of pairs of blocks, namely a profiled block and central block on one side of the rib, and a profiled block and central block on the other side of the rib, with each such S-shaped configuration extending over the width of the tread surface in a somewhat diagonal fashion; each profiled block, at an end thereof that faces the associated tire shoulder, is oriented axially at an angle of from 90° to 80° relative to the central plane of the tire; each central block, at an end thereof that faces the rib, is oriented circumferentially at an angle of from 35° to 55° relative to the central plane of the tire, with the profiled blocks and central blocks between a given tire shoulder and the rib being curved or polygonal in conformity to said angular orientation; the lateral channels between successive profiled blocks are respectively connected to one of the longitudinal channels, and at least that portion of the latter disposed between the profiled blocks and the central blocks is circumferentially oriented at an angle of from 0° to 65°; the rib and the central blocks essentially form a central profile portion that extends over 25 to 40% of the width of the tread surface; the profiled blocks and the central blocks are provided with sipes that extend parallel to the lateral channels, each sipe being connected to at least one of the longitudinal channels and venting grooves.

At the shoulder side, the profiled blocks are delimited by a separating channel, which in certain designs separates the profiled blocks from design blocks that are disposed in the beginning of the sidewalls.

Due to the combination of the profiled blocks into pairs that have an S-shaped configuration and are separated by a rib that is diagonally widened by the central blocks, and via a system of wide longitudinal and lateral channels along with parallel sipes that are vented at the grooves or channels, a tread surface profile is obtained that generates relatively little noise.

Furthermore, due to the connection of the wide, curved lateral channels to the wide and preferably staggered circumferential channels, this tread surface profile is very good at being able to remove water.

This property can be improved even further if the central rib is additionally provided with a central channel. This property, and the nibbling effect, i.e. the force and moment behavior of the tire over edges, such as tracks, can be improved still further via longitudinal grooves that divide the shoulder block into two block portions.

The generation of noise can also be reduced by staggering the edges of the profile. For example, a stagger in the diagonal S course can be provided. A staggering can also be provided in the circumferential distribution, whereby, viewed from the outside to the inside of the tire, the profiled blocks deviate from the distribution or interval width. Narrower and wider profiled blocks can also be provided. In addition, the edges of the grooves or channels can also be staggered in such a way as to provide an overlap in the circumferential direction. Furthermore, additional grooves or channels can be provided in the shoulder blocks; the shoulder blocks can extend further to include the design block region, with supplemental blocks being provided between the shoulder blocks and the central blocks of the rib.

These and further specific features of the present invention will be described in detail subsequently.

DESCRIPTION OF PREFERRED EMBODIMENTS

Referring now to the drawings in detail, the tread surface 1 of FIG. 1 essentially comprises a central, zig-zag rib 2, which is disposed in the central plane x—x of the tire in the circumferential direction, and the profiled blocks 3, 4, 3', 4' that, in pairs, give an S-shape to the profile over the width $L_B$ of the tread surface 1.

In the circumferential direction, the profiled blocks 3, 3' in the tread surface half "1" are separated from one another by lateral channels 5, and the profiled blocks 4, 4' in the other tread surface half "r" are separated from one another by lateral channels 6.

In the embodiment illustrated in FIG. 1, the channels 5 and 6 are curved. However, these channels could also be polygonal. Each profiled block extends from the shoulder $L_s$ of the tread surface to the rib 2, and is essentially in three parts.

Due to this three-part configuration, shoulder blocks are disposed to the right and to the left, and a rib is provided that is widened by the central blocks Q.

Figure 2:
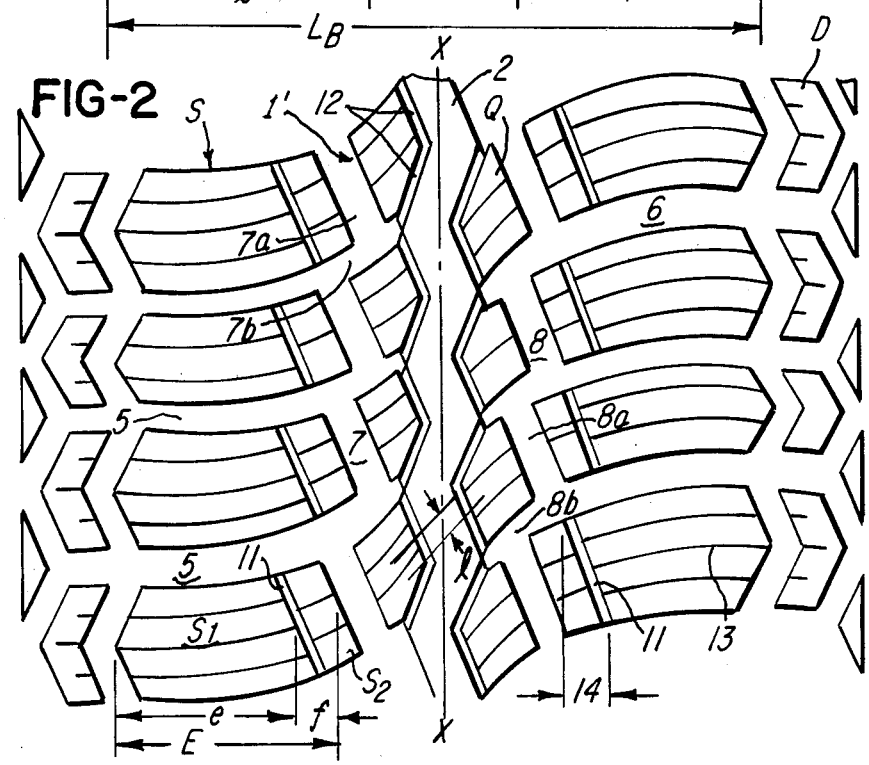
FIG. 2 is a partial plan view of a modified embodiment of the inventive profile.

In the embodiment of FIG. 2, the shoulder blocks S are divided by narrow longitudinal grooves 11 that have a maximum width of 3 mm, and which are not very deep. This depth is at most 3.5 mm to 4.0 mm, in contrast to the deep circumferential channel. The longitudinal groove 11 is a means for splitting the shoulder block, and is also a venting aid for the lamellar fine slits 13 which are also known as kerfs or sipes.

The central block Q is connected to the rib 2 and is separated therefrom, via a venting groove 12, only in the radially upper region of the profile. The groove 12 is shallow and narrow, being approximately 3.5 to 4.0 mm deep and approximately 2.5 to 3.0 mm wide. A staggered arrangement of the diagonal Q blocks is shown by the reference numeral 1. The central block Q is separated from the shoulder block S by a deep and wide drain channel 7 or 8. This drain channel is zig-zagged, and is continuous in an essentially circumferential direction. The channel portions 7a and 8a extend essentially parallel to the rib 2, being disposed at an angle γ of approximately 45°. The curved channel portions 7b and 8b, on the other hand, follow a course that continuously merges into the curved lateral channels 5 or 6. The channels are approximately 7 to 8 mm deep, and approximately 5 to 6 mm wide. The radius R of the wall of the block in the region of the block portion $S_1$ is greater than the radius "r" of the wall of the block in the region of the block portion $S_2$ and the central block Q. The result is an S-shaped curve that begins at the edge of the tread surface with an approximately axial course, and increases sharply toward the center. The edges of the blocks at the shoulder end of the block portion $S_1$ are disposed at an angle α of 90° to 80°, preferably 85°, as measured relative to the central plane x—x of the tire.

In contrast, the block edges of the rib end of the central blocks Q are disposed at an angle β of 35° to 55°, preferably 45°, again measured relative to the central plane x—x of the tire.

The design blocks D are separated from the shoulder blocks 3, 3', 4, 4' by separating channels 9 or 10. Not only these channels but also the design blocks are disposed in the transition zone from the shoulder of the tire into the non-illustrated sidewall. In FIGS. 1 and 2, the separating channels and the design blocks are shown disposed or folded out into the plane of the tread surface.

Due to the arrangement of the shoulder blocks, and the ribs with the central blocks connected thereto, a three-part configuration of the profile also results over the width $L_B$ of the tread surface. The central portion "m" forms approximately 25 to 40% of the width $L_b$ of the tread surface. The circumferential, zigzagged channels 7 and 8 have an overlapping configuration. The overlapping zone is designated by the reference symbol "z", and can have a width of from 0.5 to 2.0 times the width of the channels 7 and 8.

A further overlap is provided at the groove 11 in the shoulder block S, as shown in FIG. 2. This overlap zone is designated by the reference numeral 14, and can have a width of 1.0 to 5.0 times the width of the groove 11. The length "f" of the block portion $S_2$ is approximately 0.15 to 0.35 times the length "e" of the block $S_1$.

The blocks S and Q are provided with the lamellar fine slits or sipes 13. These sipes extend essentially parallel to the edges of the curved blocks, and to this extent conform to the blocks. The sipes open into at least one of the channels 7, 8 or separating or venting grooves 11 or 12.

In the circumferential direction of the tire, the profiled blocks 3, 3', 4, 4' are disposed at a specific, yet selectable interval "d". The shoulder blocks can be staggered, by an amount "u", from the inner side of the tire to the outer side thereof. See also the diametrical points "v" and "w". The stagger "u" can be as much as 0.2 times the length of the block interval "d".

Figure 3:
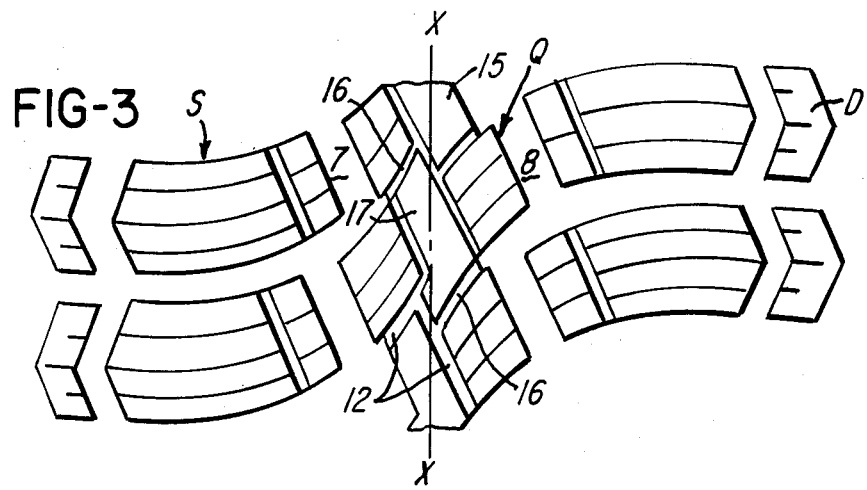
FIGS. 3 and 4 are partial plan views showing details of inventive profiles.

A further embodiment with a modified configuration of the central portion of the tread surface is illustrated in FIG. 3. In this embodiment, the rib 15 is provided with diagonal grooves 16 that divide the rib into block portions 17. The depth and width of these diagonal grooves 16 correspond to those of the venting grooves 12.

Figure 4:
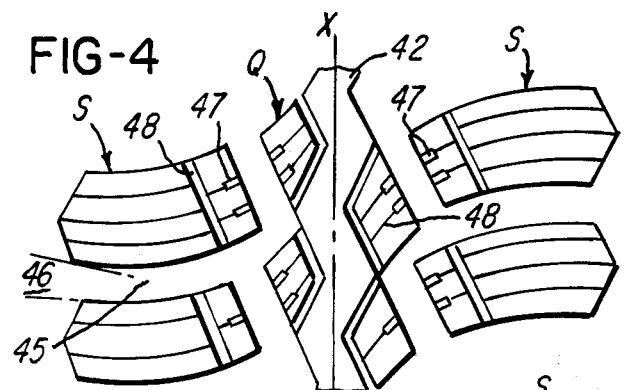

Further features are shown in the embodiment of FIG. 4. The blocks S and Q are provided with sipes 48 that have widened portions 47 where the sipes open out. In the region beyond the support surface, the lateral channels 45 are widened at the location 46, and in particular are widened or flared in a funnel-shaped manner. A rib 22 having a central groove 23 could also be provided in place of the rib 42 (see, for example, FIGS. 6, and 8-10).

Figure 5:
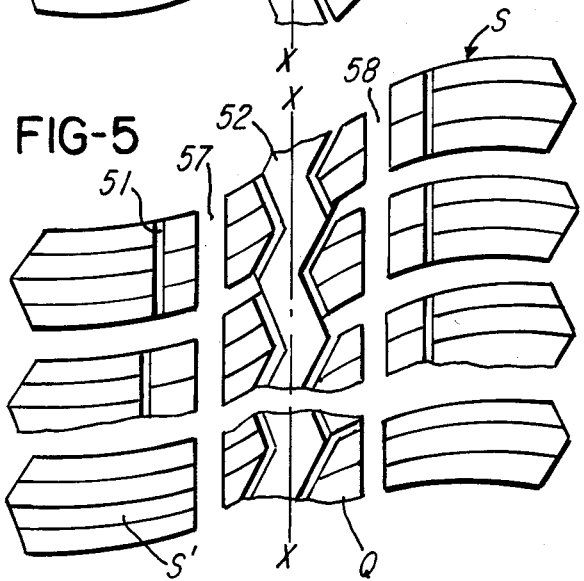
FIG. 5 is a partial plan view of a further modified inventive embodiment.

These features serve to improve the reduction of noise. Widening the lateral channels enhances the resistance to aquaplaning. The embodiment of FIG. 5 serves the same purpose via different means. The central rib 52 has blocks Q that are provided with sipes. The shoulder blocks S, which are provided with sipes, can be provided with longitudinal grooves 51 or can be in the form of the blocks S' that have no such longitudinal grooves. The important thing is that the circumferential channels 57 and 58 be disposed essentially parallel to the central plane x—x. In addition, the longitudinal grooves 51 can also follow a parallel course.

Figure 6:
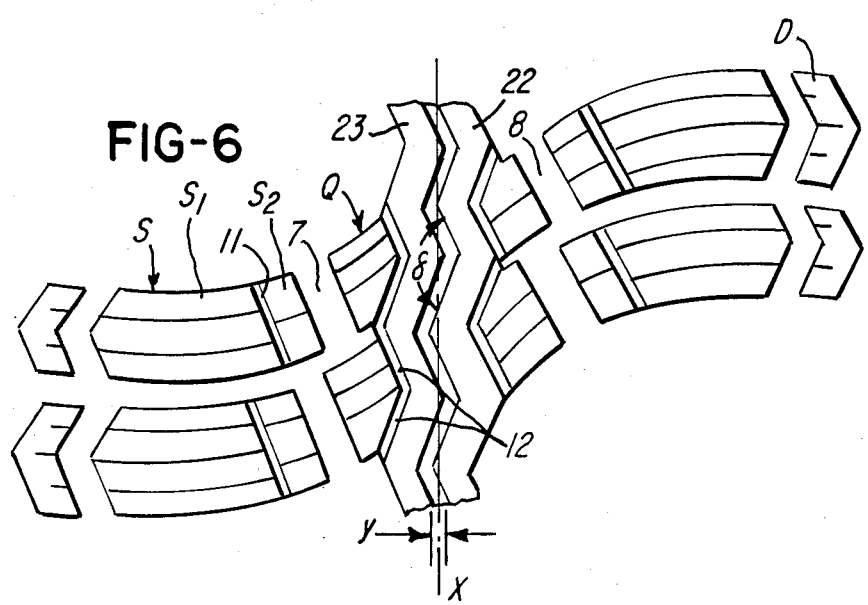
FIG. 6 is a partial plan view of another exemplary embodiment of the inventive tread surface profile.

A further embodiment of the tread surface profile is illustrated in FIG. 6. Here the central rib 22 is somewhat wider, and has a narrow, central groove 23. The width of the groove 23 is approximately 3 mm, and the depth thereof is approximately 4 mm. The groove overlap "y" is approximately 0.5 times the width of the groove 23. The venting grooves 12 and the longitudinal grooves 11 are retained.

Figure 7:
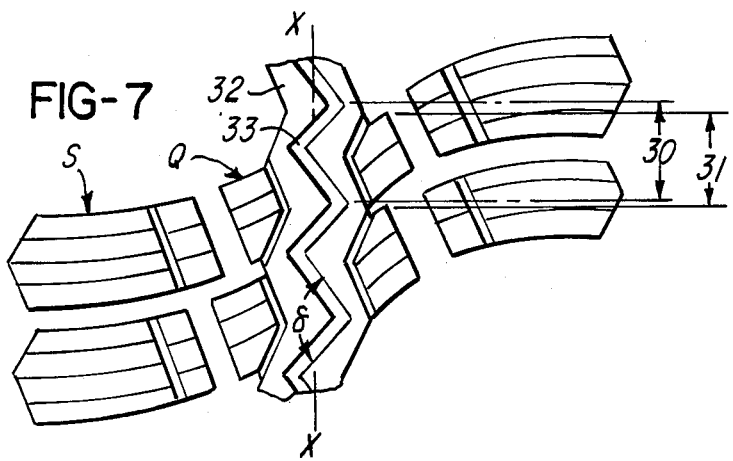
FIGS. 7 to 10 are partial plan views of details of inventive profiles.

FIG. 7 illustrates a modification of the central groove in the central rib 32. Here the central groove 33 has an amplitude 30 that is greater than the amplitude 31 of the zigzagged rib. This improves the insensitivity of the profile to grooves or edges. The angle δ of the zigzagged groove is approximately 100°. The range of the angle δ can also be between 30° and 120°.

Figure 8:
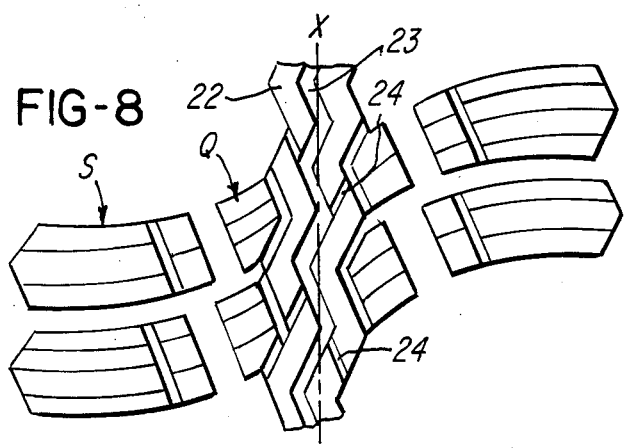

Furthermore, all of the zigzagged central grooves can be vented. In FIG. 8, the central groove 23 is vented at the central zigzagged rib 22 by diagonal venting grooves 24. These grooves have a width and depth that is similar to that of the groove 12 that separate the central block Q from the rib.

Figure 9:
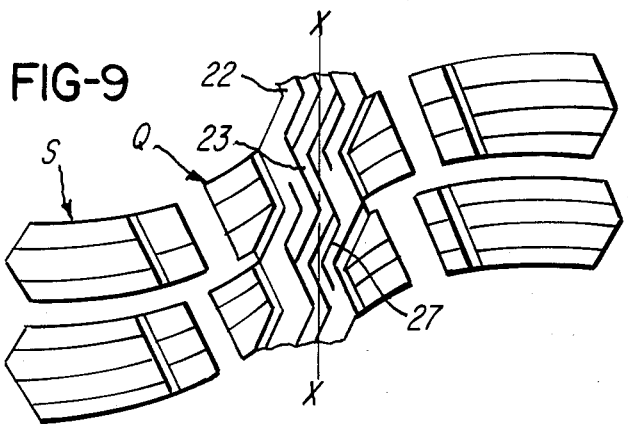
Figure 10:
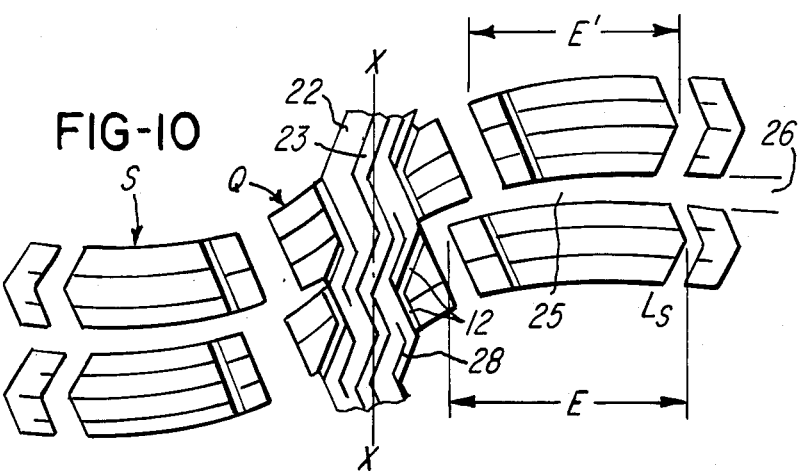

The rib 22 along with the central groove 23 can additionally be provided with lamellar fine slits or sipes. As shown in FIG. 9, these sipes are designated by the reference numeral 27, and can be vented at the central groove 23. As shown in FIG. 10, the sipes are designated by the reference numeral 28, and can be vented at the outer edge of the rib.

As also shown in FIG. 10, in order to improve the insensitivity to grooves and edges, shorter shoulder blocks having a length E', and longer shoulder blocks having a length E, are alternately provided. This establishes a staggered edge arrangement, such as is also possible by overlapping.

Pursuant to FIG. 10, the lateral channels 25 are funnel-shaped or flared in the direction toward the shoulder $L_s$, as shown at 26. This further improves the resistance to aquaplaning and the reduction of noise. Via the further sipes 27, 28 at the rib 22, the reduction of noise and the resistance to wear in the center are further improved.

The additional features illustrated in FIGS. 4 and 8 to 10 also serve to improve the reduction of noise and the resistance to aquaplaning.

Figure 11:
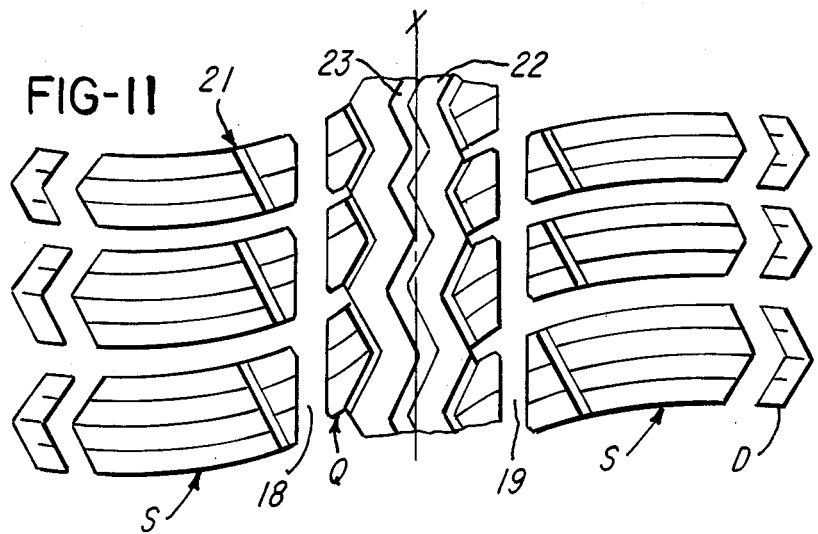
FIG. 11 is a partial plan view of a further modified inventive profile.

A further embodiment of the tread surface profile is shown in FIG. 11, where the circumferential grooves 18, 19 are relatively parallel to the plane x—x, and the grooves 21 extend diagonally. These features similarly serve to optimize the reduction of noise and the resistance to aquaplaning.

Figure 12:
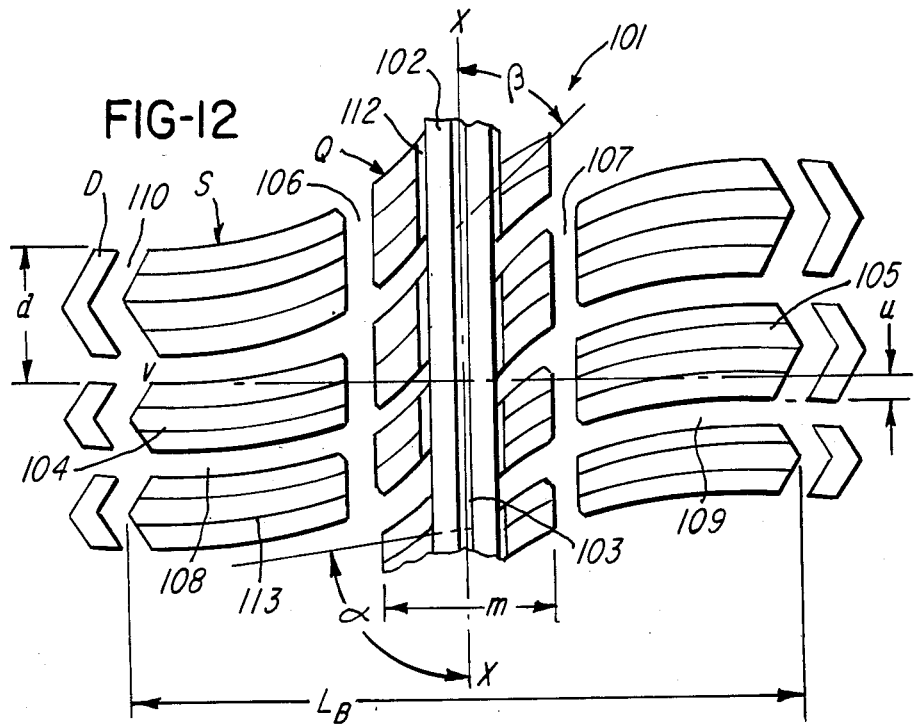
FIG. 12 is a partial plan view of another exemplary embodiment of an inventive tread surface profile.

The tread surface 101 of FIG. 12 essentially comprises a linear, central rib 102 that is provided with a linear central groove 103, and the pairs of S-shaped blocks 104 and 105 that are provided over the width $L_B$ of the tread surface. These pairs of blocks are each divided into a shoulder block S and a central block Q. At the shoulder side, the shoulder block S is oriented axially, with the edges extending at an angle α of 85°. The central block Q is connected to the rib 102 and is separated from the latter by only a shallow and narrow venting groove 112. The central block Q is connected to the rib in a circumferentially oriented manner, with the angle 8 being between 35° and 55°.

On both sides of the rib, the S-shaped pairs of blocks are divided by longitudinal channels 106. 107 that extend in the circumferential direction. These longitudinal channels are connected to the eccentric, curved, or polygonal lateral channels 108, 109.

The shoulder blocks S and central blocks Q are provided with a plurality of parallel lamellar fine slits or sipes 113 that essentially extend parallel to the lateral channels 108 or 109. These sipes can be vented at the longitudinal channels 106 107 or at the venting grooves 112.

The profile disposed in the central portion of the tread surface, and comprising the rib and central blocks, is provided over approximately 25 to 45% of the width $L_B$. At the shoulder sides $L_D$, the profile is separated from the design blocks D by separating channels 110, 111. In the drawing, these separating channels and design blocks are illustrated as being turned up into the plane of the tread surface.

The interval between the profile elements is designated with the reference symbol "d". When viewed over the width of the tread surface, a staggering "u" of the blocks in the circumferential direction can exist between the diametrical points "v" and "w" in the magnitude of up to 0.2 times the length of the block interval "d".

Figure 13:
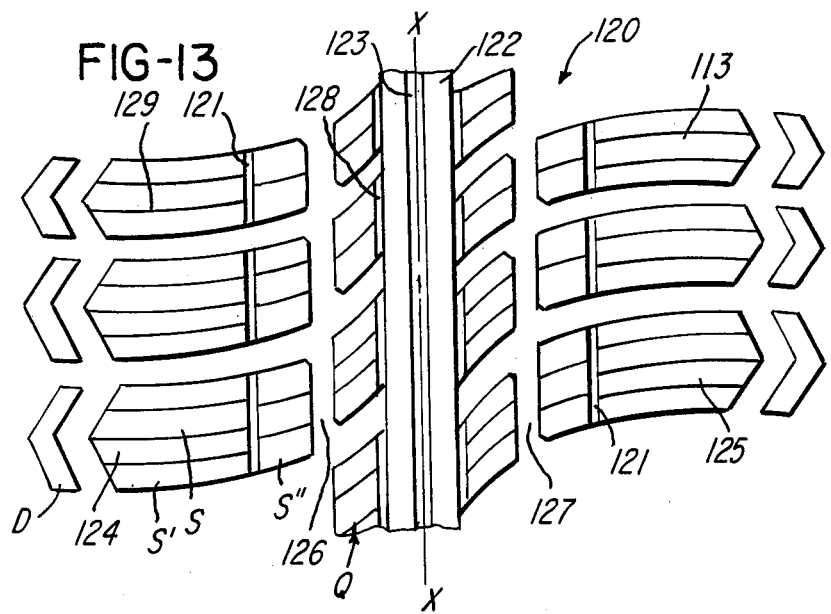
FIG. 13 is a partial plan view of an amplified profile embodiment.

The tread surface 120 of FIG. 13 essentially corresponds to the tread surface of FIG. 12, although in this embodiment the rib is designated by the reference numeral 122, the central groove with the reference numeral 123, and the venting grooves with the reference numeral 128.

The shoulder blocks S are additionally provided with an essentially linear groove 121 that is fairly shallow and narrow. The grooves 121 serve for the additional venting of the sipes 113, and have advantages with respect to insensitivity to any tendency to follow rail tracks. The grooves 121 separate the blocks S into block portions S' and S''. Each shoulder block 124, 125 of an S-shaped pair of blocks is separated from the central block Q that is connected to the rib via linear longitudinal channels 126, 127. Each central block Q is separated from the rib by a shallow and narrow venting groove 128.

Figure 14:
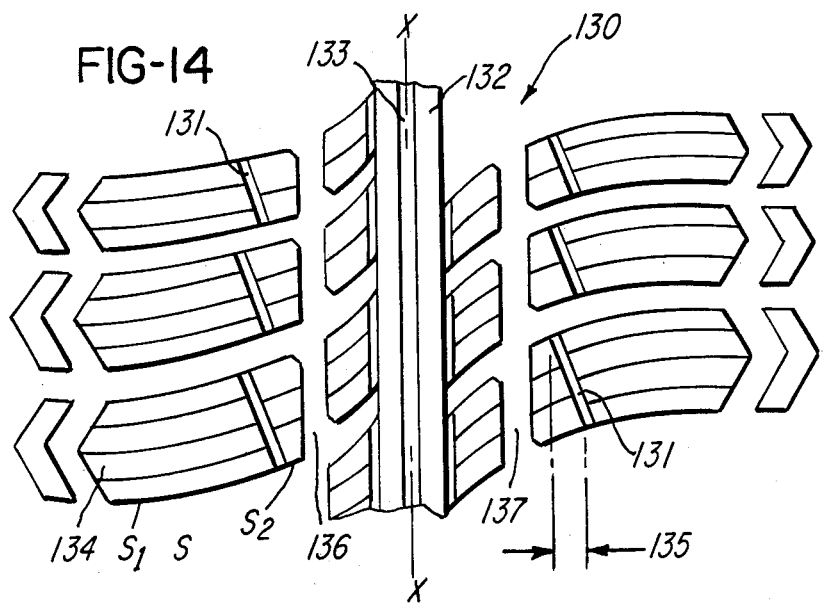
FIG. 14 is a partial plan view of a modified embodiment of the inventive profile.

The tread surface of FIG. 14 shows a modified orientation of the longitudinal grooves 131 in the shoulder block. In particular, the longitudinal grooves 131 have a diagonal orientation. The longitudinal grooves can have an overlap 135 that is one to five times the width of the groove. The rib 132 that has the linear groove 133 similarly has directly connected thereto circumferentially oriented central blocks Q. The grooves 131 separate the shoulder blocks into block sections $S_1$ and $S_2$. The longitudinal channels, which extend linearly and separate the shoulder blocks S from the central blocks Q, are designated by the reference numeral 136 and 137.

Figure 15:
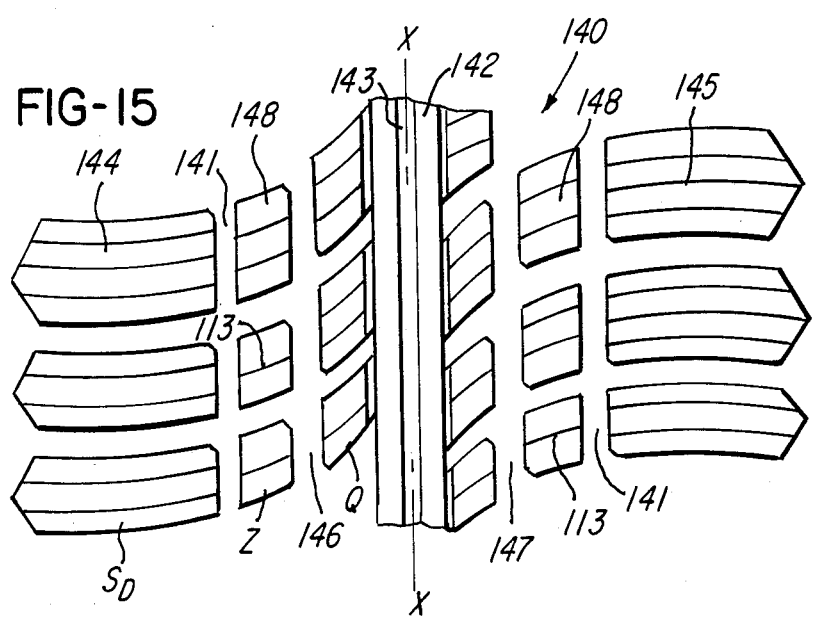
FIG. 15 is a partial plan view of a further exemplary embodiment of the inventive profile.

The tread surface of FIG. 15 is modified relative to the profile of the embodiments of FIGS. 12 to 14. Each shoulder block $S_D$ is lengthened until it extends to the design block region, with separate design blocks no longer being provided. The blocks of the S-shaped pairs of blocks 144, 145 comprise the lengthened shoulder block $S_D$, the central block Q that is connected directly to the rib 142 that has the linear groove 143, and in each case a supplemental block 148 that is disposed between the shoulder block $S_D$ and the central block Q. This supplemental block 148 is separated from the shoulder block $S_D$ by the widened groove 141. Furthermore, the supplemental block 148 is separated from the central block Q by the longitudinal channel 146 or 147. Just like the shoulder block and the central block, the supplemental block 148 is appropriately curved or polygonal. All of the blocks $S_D$, 148 or Z, and Q of the S-shaped pair of blocks are provided with sipes 113 that extend essentially parallel to the lateral channels of the profile.

The present invention is, of course, in no way restricted to the specific disclosure of the specification and drawings, but also encompasses any modifications within the scope of the appended claims.

What we claim is:

1. A tread surface profile for a pneumatic vehicle tire that has a radial carcass construction with a belt-like reinforcement, said tread surface profile comprising:
   an essentially three-part configuration that includes:
   a circumferentially extending rib that is disposed in the central plane of said tire, said rib having connected on both sides thereof a plurality of central blocks that are separated from said rib at respective surface portions on account of shallow and narrow venting grooves yet interconnected at respective base portions beneath the deepest extent of the venting grooves; and
   on both sides of said rib with its central blocks, pluralities of profiled blocks that respectively extend from a tire shoulder toward said rib, with the profiled blocks on a given side of said rib being separated from the central blocks of the latter by a longitudinal, circumferentially extending channel, and being separated from one another, when view in the circumferential direction of the tire, by respective lateral channels, with the latter and said longitudinal channels being deeper and wider than said venting grooves; said profiled blocks and said central blocks are disposed in such a way that respective S-shaped configurations are formed that are comprised of a profiled block and central block on one axial side of the rib and a profiled block and central block on the other axial side of the rib, with each such S-shaped configuration extending over the entire width of the tread surface in a generally diagonal fashion to the central tire plane; each of said profiled blocks, at an end thereof facing the associated tire shoulder, is oriented axially at an angle in a range of from 90° to 80° relative to said central plane of said tire, and each of said central blocks, at an end thereof facing said rib, is oriented circumferentially at an angle in a range of from 35° to 55° relative to said central plane of said tire, with said profiled blocks and said central blocks between a given tire shoulder and said rib being curved in conformity to said angular orientation; said lateral channels are respectively connected to one of said longitudinal channels, and at least that portion of the latter that is disposed between respective profiled and central blocks is circumferentially oriented at an angle in a range of from 0° to 65°; said rib and said central blocks essentially form a central profile portion that extends over 25 to 40% of the width of the tread surface; said profiled blocks and said central blocks are provided with sipes that extend parallel to said lateral channels, each of said sipes being connected to at least one of the group consisting of said longitudinal channels and said venting grooves.

2. A tread surface profile according to claim 1, in which said rib has a zigzagged configuration, and said longitudinal channels also have a zigzagged configuration, including as longitudinal portions said portions that are oriented at 0° to 65° and are disposed between respective profiled and central blocks, and also including therebetween transversely extending portions that are oriented as continuations of said lateral channels.

3. A tread surface profile according to claim 2, in which said rib is provided with additional grooves for interconnecting said venting grooves.

4. A tread surface profile according to claim 2, in which said rib has a zigzagged central groove.

5. A tread surface profile according to claim 4, in which the angle formed by portions of said central groove is from 30° to 120°.

6. A tread surface profile according to claim 5, in Which said rib and central groove have the same zigzagged configuration.

7. A tread surface profile according to claim 5, in which said rib and said central groove have different amplitudes.

8. A tread surface profile according to claim 5, in which said central groove has an overlap that is 0.1 to 3 times the width of said central groove.

9. A tread surface profile according to claim 5, in Which said central groove is provided with lateral venting grooves that connect to said venting grooves that separate said central blocks from said rib.

10. A tread surface profile according to claim 5, in which said rib is provided with sipes that are connected to said central groove.

11. A tread surface profile according to claim 2, in which each of said longitudinal channels has an overlap that is 0.5 to 2 times the width of said channel.

12. A tread surface profile according to claim 2, in which said rib is provided with sipes that are connected to said venting grooves.

13. A tread surface profile according to claim 2, in which said longitudinal channels are disposed parallel to said central plane of said tire.

14. A tread surface profile according to claim 1, in which said rib has a linear configuration and is provided with a continuous, circumferentially extending central groove; and in which said Iongitudinal channels also have a linear configuration.

15. A tread surface profile according to claim 1, in which at least some of said profiled blocks are provided with a shallow and narrow longitudinal groove that divides said profiled block into two block portions.

16. A tread surface profile according to claim 15, in which said longitudinal groove is Iinear, and extends in the circumferential direction of said tire, hence being parallel to said central plane of the latter.

17. A tread surface profile according to claim 15, in which said longitudinal grooves extend diagonally, having an overlap of from 1 to 5 times the width of said groove.

18. A tread surface profile according to claim 1, in which the length of said profiled blocks changes after every fourth block when viewed in the circumferential direction.

19. A tread surface profile according to claim 1, in which the length of said profiled blocks varies alternately in the circumferential direction.

20. A tread surface profile according to claim 1, in which said profiled blocks, at diametrical points on both sides of said rib, have a stagger that is equal to 0 to 0.2 times the magnitude of the interval between successive ones of said profiled blocks.

21. A tread surface profile according to claim 1, in which said latral channels are flared in the direction toward their associated tire shoulder.

22. A tread surface profile according to claim 1, in which said lateral channels, in a region beyond a support surface portion of said tread surface, have a flared configuration.

23. A tread surface profile according to claim 1, in which said sipes in said profiled and central blocks open into said longitudinal channels via respective widened portions.

24. A tread surface profile according to claim 1, in which each of said tire shoulders is provided with design blocks that are disposed in such a way that they respectively form an extension of said S-shaped configuration; and in which said profiled blocks on a given side of said rib are separated from their associated design blocks by a circumferentially extending separating channel of zigzag configuration.

25. A tread surface profile according to claim 24, in which said design blocks are provided with sipes.

26. A tread surface profile according to claim 1, in which each of said profiled blocks extends into a tire shoulder region of said tire; and which includes between each profiled block and central block a supplemental block that is separated from the latter via said longitudinal channel, and is separated from said profiled block via a further channel.

27. A tread surface profile according to claim 26, in which said supplemental block is provided with sipes.

28. A tread surface profile according to claim 26, in which said further channel is also in the form of a longitudinal channel.

* * * * *

UNITED STATES PATENT AND TRADEMARK OFFICE
CERTIFICATE OF CORRECTION

PATENT NO. : 4,815,512
DATED : Mar. 28, 1989
INVENTOR(S) : Manfred Gerresheim et al It is certified that error appears in the above-identified patent and that said Letters Patent is hereby corrected as shown below:

On the title-abstract page, the following should be corrected:

[75] fourth inventor's name should be spelled correctly:
Hans-Jürgen Vögler;

Signed and Sealed this

Seventeenth Day of October, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,815,512
DATED     : Mar. 28, 1989
INVENTOR(S) : Manfred Gerresheim et al It is certified that error appears in the above-identified patent and that said Letters Patent is hereby corrected as shown below:

On the title-abstract page, the following should be corrected to read:

[30]  Foreign Application Priority Data (second line):
      Oct. 29, 1986 [DE] Fed.Rep.of Germany....8628836

Signed and Sealed this

Fourteenth Day of November, 1989

*Attest:*

JEFFREY M. SAMUELS

*Attesting Officer*     *Acting Commissioner of Patents and Trademarks*